United States Patent
Cartan

(10) Patent No.: US 8,451,271 B2
(45) Date of Patent: May 28, 2013

(54) METHODS AND SYSTEMS FOR DISPLAYING GRAPHICAL MARKERS IN A MIXED BOX CHART

(75) Inventor: John Cartan, Alameda, CA (US)

(73) Assignee: Oracle International Corporation, Redwood Shores, CA (US)

( * ) Notice: Subject to any disclaimer, the term of this patent is extended or adjusted under 35 U.S.C. 154(b) by 550 days.

(21) Appl. No.: 12/357,640

(22) Filed: Jan. 22, 2009

(65) Prior Publication Data

US 2010/0182321 A1   Jul. 22, 2010

(51) Int. Cl.
G06T 11/20   (2006.01)

(52) U.S. Cl.
USPC .......................... 345/440; 345/419

(58) Field of Classification Search
USPC ............... 345/440; 705/7.42; 715/810
See application file for complete search history.

(56) References Cited

U.S. PATENT DOCUMENTS

| | | | |
|---|---|---|---|
| 6,253,220 B1 | 6/2001 | Le Beux et al. | |
| 6,427,983 B1 | 8/2002 | Leonhardt et al. | |
| 7,315,704 B2 * | 1/2008 | Shin et al. | 399/57 |
| 7,346,048 B1 * | 3/2008 | Vogel | 370/376 |
| 7,584,452 B1 * | 9/2009 | Johnson | 717/116 |
| 7,750,916 B2 | 7/2010 | Whitaker | |
| 2003/0055710 A1 * | 3/2003 | Burk et al. | 705/10 |
| 2007/0027736 A1 * | 2/2007 | Reynolds et al. | 705/8 |
| 2007/0067798 A1 * | 3/2007 | Wroblewski | 725/37 |
| 2009/0061397 A1 * | 3/2009 | Treloar | 434/129 |
| 2010/0060667 A1 * | 3/2010 | Chen et al. | 345/690 |
| 2010/0182320 A1 | 7/2010 | Cartan | |

OTHER PUBLICATIONS

John F. Lacher et al.; "Using Custom Chart Markers in XY Chart"; May 21, 1996; http://www.lacher.com/examples/960525a.htm.*
Craig Stinson et al.; "Microsoft® Office Excel 2003 Inside Out"; Sep. 3, 2003; Microsoft Press; p. 586.*
Stephen Few; "Solutions to the Problems of Over-Plotting in Graphs"; Perceptual Edge; Sep./Oct. 2008; pp. 1-6; http://www.perceptualedge.com/articles/visual—business—intelligence/over-plotting—in—graphs.pdf.*
U.S. Appl. No. 12/357,637, filed Jan. 22, 2009, 29 pages.
Wallace, "Beginning Programming All-In-One Desk Reference for Dummies," Jun. 3, 2008, For Dummies, p. 201.
U.S. Appl. No. 12/357,637, filed Jan. 22, 2009, Advisory Action mailed Feb. 22, 2012, 3 pages.
U.S. Appl. No. 12/357,637, filed Jan. 22, 2009, Final Office Action mailed Dec. 14, 2011, 45 pages.
U.S. Appl. No. 12/357,637, filed Jan. 22, 2009, Office Action mailed Jul. 19, 2011, 34 pages.

* cited by examiner

Primary Examiner — Said Broome
Assistant Examiner — Peter Hoang
(74) Attorney, Agent, or Firm — Kilpatrick Townsend & Stockton LLP

(57) ABSTRACT

This disclosure describes, generally, methods and systems for plotting a graphically displayed box chart. The method includes receiving a data set. The data set includes a first axis and a second axis and the data set consists of ordered pairs. The method further includes determining that the first axis is discrete and that the second axis is continuous and rounding values of the second axis' portion of the ordered pairs of the data set, based on a first level of granularity. The method includes based on the rounded values, creating data point groupings, and based on the data point groupings, determining a total number of data point locations for the first axis. The method further includes jittering values of the first axis' portion of the ordered pairs of the data set at each determined data point location, wherein the jittering alters the values based on a second level of granularity.

19 Claims, 10 Drawing Sheets

Both Dimensions Continuous

Both Dimensions Discrete

X Axis Continuous, Y Axis Discrete

X Axis Discrete, Y Axis Continuous

Clumping Table

FIG. 7

X Axis Continuous and Y axis Discrete

X Axis Discrete and Y axis Continuous

METHODS AND SYSTEMS FOR DISPLAYING GRAPHICAL MARKERS IN A MIXED BOX CHART

RELATED APPLICATION

The application relates to co-pending U.S. patent application Ser. No. 12/357,637, filed Jan. 22, 2009, entitled METHODS AND SYSTEMS FOR DISPLAYING GRAPHICAL MARKERS IN A DISCRETE BOX CHART, filed concurrently with the application.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates, in general, to graphical representations and, more particularly, to displaying graphical markers in mixed box charts.

BACKGROUND

Typically, a box chart displays X and Y values that are partitioned into a small number of boxes (e.g., 3×3, 4×4, etc.). Such a configuration allows analysts to more easily categorize and focus on subsets within the data being represented by the chart. When both dimensions (i.e., the x-axis and the y-axis) are continuous, the chart looks similar (and functions similarly) to a scatter plot (see FIG. 1A). However, when both dimensions are discrete, (i.e., where both dimensions consist of a limited set of specific values) most of the plotted markers overlap, making the chart difficult to read or understand. Thus, in this situation, a typical scatter plot becomes impractical.

For example, if employee performance vs. employee potential is being plotted, where both scores are either high, medium, or low, there are only 9 possible combinations. If, for example, one hundred employees are being plotted on this 3×3 grid, some of the 9 boxes may hold many markers which all have identical (x,y) values. Accordingly, if markers are simply plotted in the center of each box, the viewer has no way of perceiving whether an individual box holds one, ten, or one hundred markers. However, plotting markers at random locations within each box is misleading because such a plotting suggests that some markers within a box have higher scores (or weighting) than others (see FIG. 1B).

In some prior implementations, this problem is avoided by requiring both dimensions to be continuous. Alternatively, in order to avoid plotting the markers, scrolling text lists for each box may be provided. Furthermore, the markers may be plotted randomly (as in FIG. 1B) or from left to right starting in the upper left corner of each box (see FIGS. 2A & 2B). Nonetheless, all of these workarounds are unsatisfactory; they are either too limiting or produce displays of the data which are misleading and/or difficult to understand. Accordingly, these problem have significantly limited the widespread use of box charts as a general analytical tool. Hence, there is a need for improved methods and systems in the art.

BRIEF SUMMARY

Embodiments of the present invention are directed to a computer implemented method of plotting a graphically displayed box chart. The method includes receiving, at a host computer system, a data set. The data set includes a first axis and a second axis and the data set consists of ordered pairs. The method further includes determining that the first axis is discrete and that the second axis is continuous and rounding values of the second axis' portion of the ordered pairs of the data set, based on a first level of granularity. The method further includes based on the rounded values, creating data point groupings, and based on the data point groupings, determining a total number of data point locations for the first axis.

Furthermore, the method includes jittering values of the first axis' portion of the ordered pairs of the data set at each determined data point location, wherein the jittering alters the values based on a second level of granularity, reverting the rounded values back to the original values, and based on the jittered values for the first axis and the original values for the second axis, plotting, at the host computer system, the data points in a box chart. Further, the method includes displaying the box chart on a display screen.

In a further embodiment, a system for plotting a graphically displayed box chart, is described. The system includes a display device, a processor coupled with the display device, and a memory device coupled with the processor. The memory device has sets of instructions stored thereon which, when executed by the processor, cause the processor to perform the following method. The method includes receiving, at a host computer system, a data set. The data set includes a first axis and a second axis and the data set consists of ordered pairs. The method further includes determining that the first axis is discrete and that the second axis is continuous and rounding values of the second axis' portion of the ordered pairs of the data set, based on a first level of granularity. The method further includes based on the rounded values, creating data point groupings, and based on the data point groupings, determining a total number of data point locations for the first axis.

Furthermore, the method includes jittering values of the first axis' portion of the ordered pairs of the data set at each determined data point location, wherein the jittering alters the values based on a second level of granularity, reverting the rounded values back to the original values, and based on the jittered values for the first axis and the original values for the second axis, plotting, at the host computer system, the data points in a box chart. Further, the method includes displaying the box chart on a display screen.

In an alternative embodiment, a machine-readable medium is described. The machine-readable medium includes instructions for plotting a graphically displayed box chart. The machine-readable medium includes instructions for receiving, at a host computer system, a data set. The data set includes a first axis and a second axis and the data set consists of ordered pairs. The machine-readable medium further includes instructions for determining that the first axis is discrete and that the second axis is continuous and rounding values of the second axis' portion of the ordered pairs of the data set, based on a first level of granularity. The machine-readable medium further includes instructions for based on the rounded values, creating data point groupings, and based on the data point groupings, determining a total number of data point locations for the first axis.

Furthermore, the machine-readable medium includes instructions for jittering values of the first axis' portion of the ordered pairs of the data set at each determined data point location, wherein the jittering alters the values based on a second level of granularity, reverting the rounded values back to the original values, and based on the jittered values for the first axis and the original values for the second axis, plotting, at the host computer system, the data points in a box chart. Further, the machine-readable medium includes instructions for displaying the box chart on a display screen.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 7 is a diagram illustrating a table according to one embodiment of the present invention.

DETAILED DESCRIPTION OF THE INVENTION

While various aspects of embodiments of the invention have been summarized above, the following detailed description illustrates exemplary embodiments in further detail to enable one of skilled in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Figure 1A:
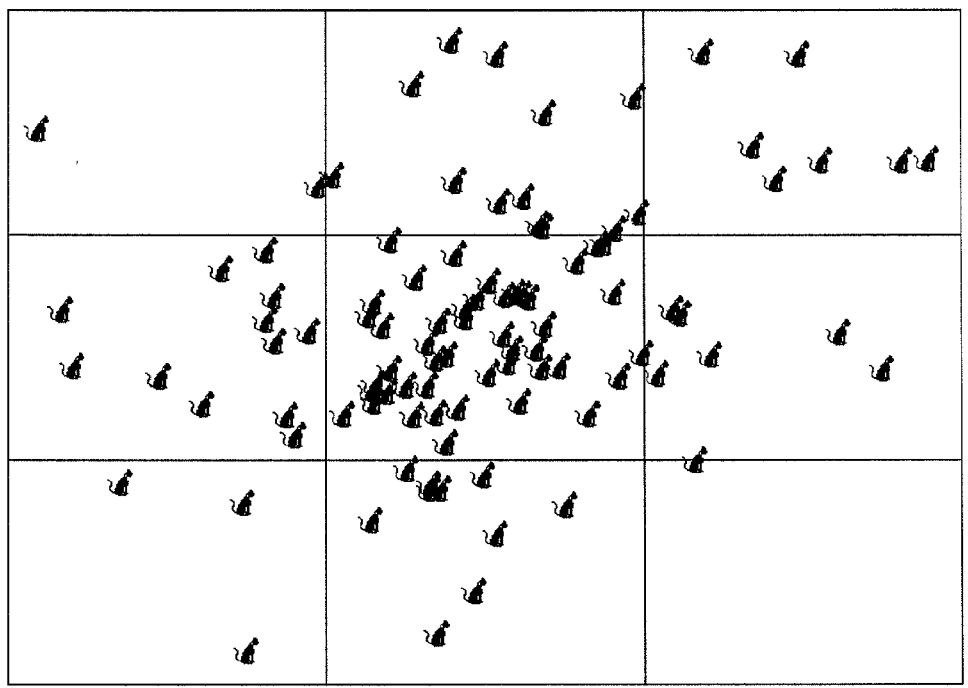
FIGS. 1A and 1B are prior art diagrams illustrating box charts with a continuous x-axis and a continuous y-axis and a discrete x-axis and a discrete y-axis, respectively.
Figure 1B:
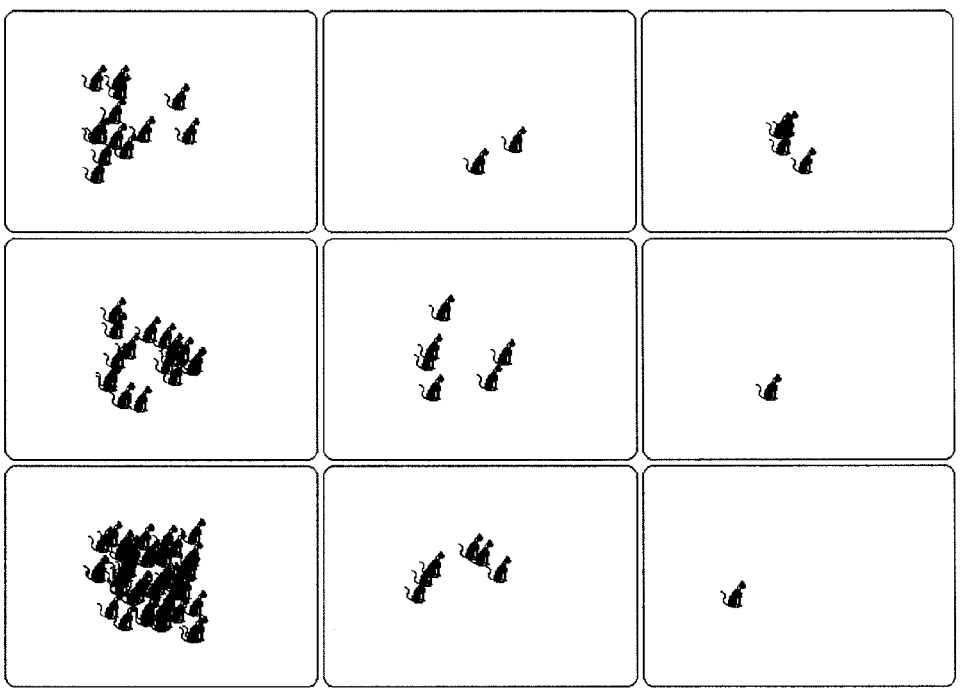
Figure 2A:
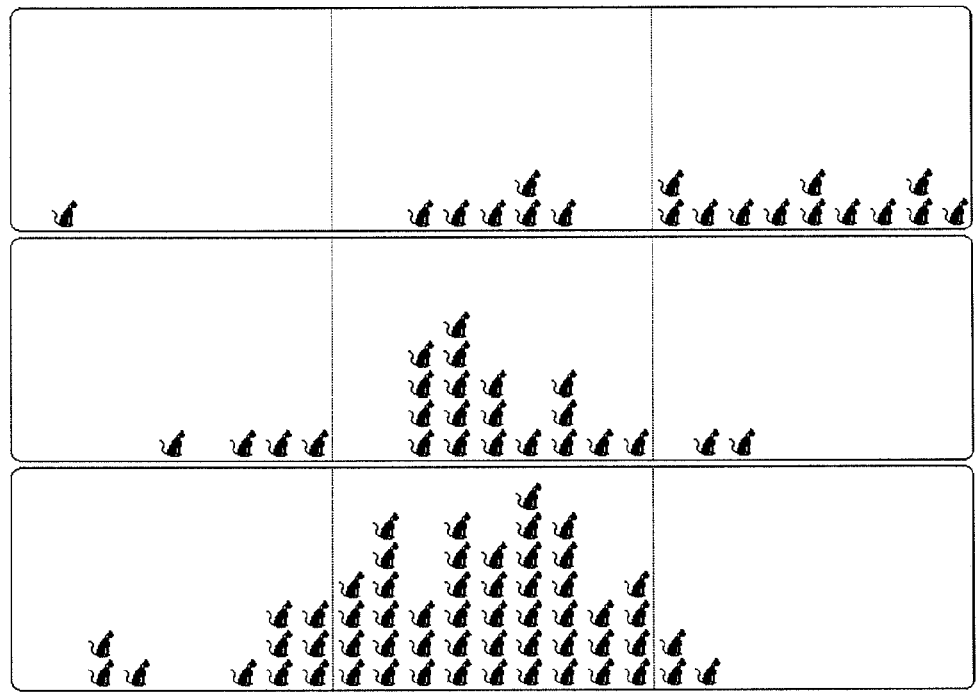
FIGS. 2A and 2B are prior art diagrams illustrating box charts with a continuous x-axis and a discrete y-axis and a discrete x-axis and a continuous y-axis, respectively
Figure 2B:
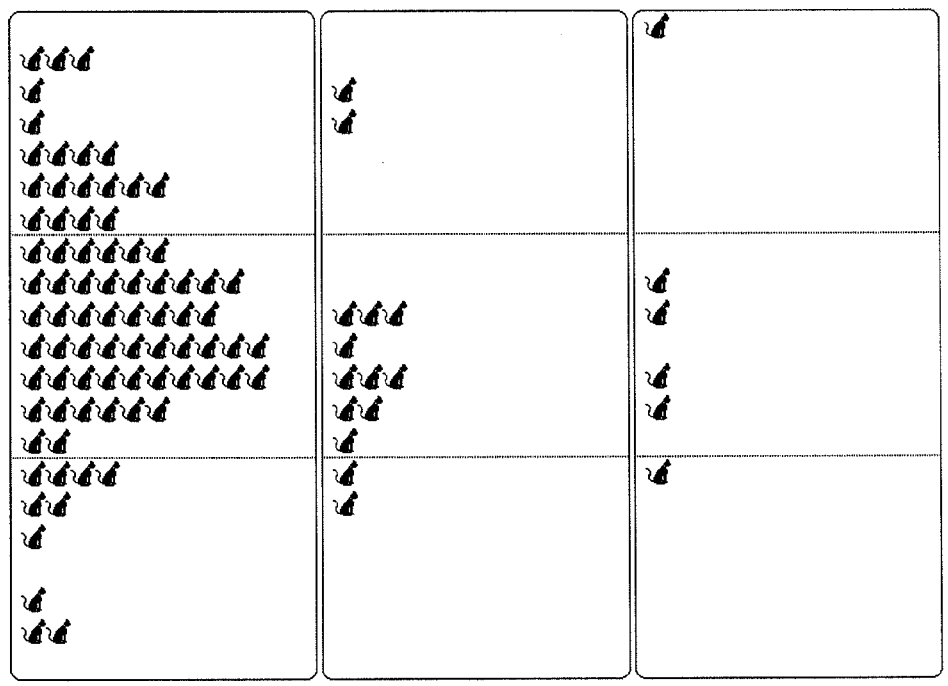
Figure 3:
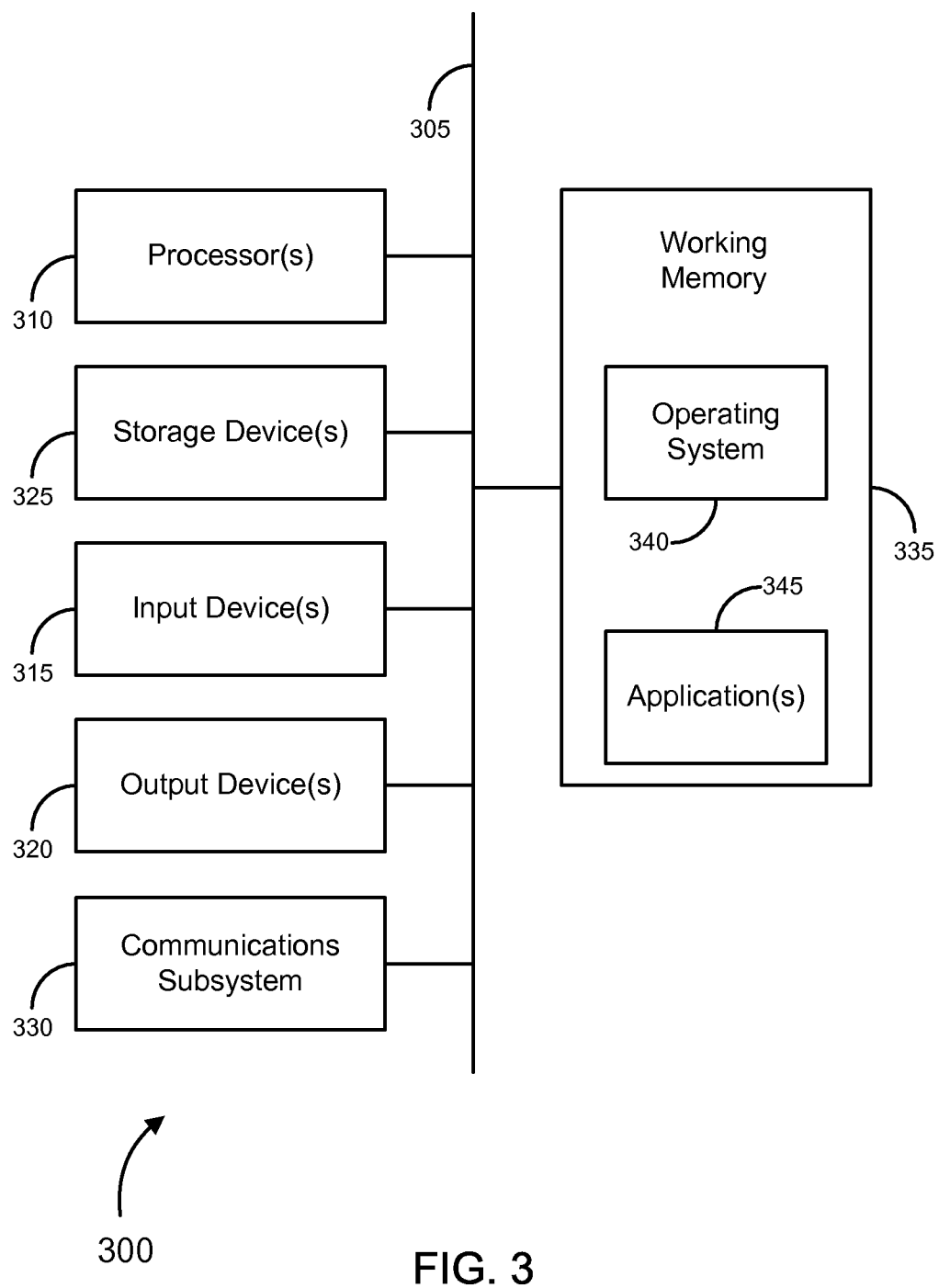
FIG. 3 is a generalized schematic diagram illustrating a computer system, in accordance with various embodiments of the invention.

FIG. 3 provides a schematic illustration of one embodiment of a computer system 300 that can perform the methods of the invention, as described herein. It should be noted that FIG. 3 is meant only to provide a generalized illustration of various components, any or all of which may be utilized as appropriate. FIG. 3, therefore, broadly illustrates how individual system elements may be implemented in a relatively separated or relatively more integrated manner.

The computer system 300 is shown comprising hardware elements that can be electrically coupled via a bus 305 (or may otherwise be in communication, as appropriate). The hardware elements can include one or more processors 310, including without limitation, one or more general-purpose processors and/or one or more special-purpose processors (such as digital signal processing chips, graphics acceleration chips, and/or the like); one or more input devices 315, which can include without limitation a mouse, a keyboard and/or the like; and one or more output devices 320, which can include without limitation a display device, a printer and/or the like.

The computer system 300 may further include (and/or be in communication with) one or more storage devices 325, which can comprise, without limitation, local and/or network-accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 300 might also include a communications subsystem 330, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 330 may permit data to be exchanged with a network (such as the network described below, to name one example), and/or any other devices described herein. In many embodiments, the computer system 300 will further comprise a working memory 335, which can include a RAM or ROM device, as described above.

The computer system 300 also can comprise software elements, shown as being currently located within the working memory 335, including an operating system 340 and/or other code, such as one or more application programs 345, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer-readable storage medium, such as the storage device(s) 325 described above. In some cases, the storage medium might be incorporated within a computer system, such as the system 300. In other embodiments, the storage medium might be separate from a computer system (i.e., a removable medium, such as a compact disc, etc.), and is provided in an installation package, such that the storage medium can be used to program a general purpose computer with the instructions/code stored thereon. These instructions might take the form of executable code, which is executable by the computer system 300 and/or might take the form of source and/or installable code, which, upon compilation and/or installation on the computer system 300 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 300) to perform methods of the invention. According to a set of embodiments, some or all of the procedures of such methods are performed by the computer system 300 in response to processor 310 executing one or more sequences of one or more instructions (which might be incorporated into the operating system 340 and/or other code, such as an application program 345) contained in the working memory 335. Such instructions may be read into the working memory 335 from another machine-readable medium, such as one or more of the storage device(s) 325. Merely by way of example, execution of the sequences of instructions contained in the working memory 335 might cause the processor(s) 310 to perform one or more procedures of the methods described herein.

The terms "machine-readable medium" and "computer readable medium", as used herein, refer to any medium that participates in providing data that causes a machine to operate in a specific fashion. In an embodiment implemented using the computer system 300, various machine-readable media might be involved in providing instructions/code to processor(s) 310 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 325. Volatile media includes, without limitation, dynamic memory, such as the working memory 335. Transmission media includes coaxial cables, copper wire and fiber optics, including the wires that comprise the bus 305, as well as the various components of the communications subsystem 330 (and/or the media by which the communications subsystem 330 provides communication with other devices). Hence, transmission media can also take the form of waves (including without limitation radio, acoustic and/or light waves, such as those generated during radio wave and infrared data communications).

Common forms of physical and/or tangible computer-readable media include, for example, a floppy disk, a flexible disk, a hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 300. These signals, which might be in the form of electromagnetic signals, acoustic signals, optical signals and/or the like, are all examples of carrier waves on which instructions can be encoded, in accordance with various embodiments of the invention.

The communications subsystem 330 (and/or components thereof) generally will receive the signals, and the bus 305 then might carry the signals (and/or the data, instructions, etc., carried by the signals) to the working memory 335, from which the processor(s) 305 retrieves and executes the instructions. The instructions received by the working memory 335 may optionally be stored on a storage device 325 either before or after execution by the processor(s) 310.

Figure 4:
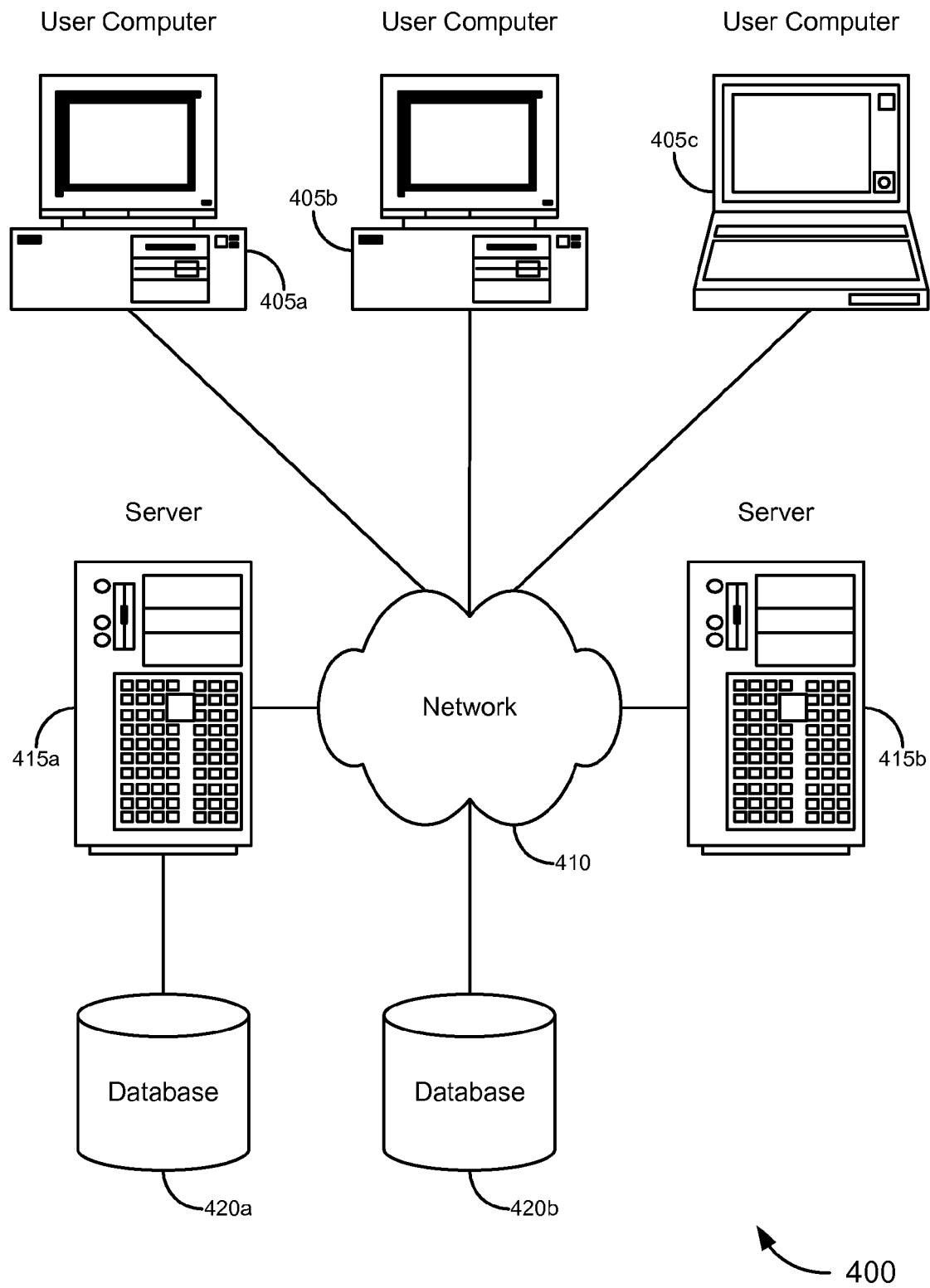
FIG. 4 is a block diagram illustrating a networked system of computers, which can be used in accordance with various embodiments of the invention.

Merely by way of example, FIG. 4 illustrates a schematic diagram of a system 400 that can be used in accordance with one set of embodiments. The system 400 can include one or more user computers 405. The user computers 405 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially available UNIX™ or UNIX-like operating systems. These user computers 405 can also have any of a variety of applications, including one or more applications configured to perform methods of the invention, as well as one or more office applications, database client and/or server applications, and web browser applications. Alternatively, the user computers 405 can be any other electronic device, such as a thin-client computer, Internet-enabled mobile telephone, and/or personal digital assistant (PDA), capable of communicating via a network (e.g., the network 410 described below) and/or displaying and navigating web pages or other types of electronic documents. Although the exemplary system 400 is shown with three user computers 405, any number of user computers can be supported.

Certain embodiments of the invention operate in a networked environment, which can include a network 410. The network 410 can be any type of network familiar to those skilled in the art that can support data communications using any of a variety of commercially available protocols, including without limitation TCP/IP, SNA, IPX, AppleTalk, and the like. Merely by way of example, the network 410 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infrared network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 415. Each of the server computers 415 may be configured with an operating system, including without limitation any of those discussed above, as well as any commercially (or freely) available server operating systems. Each of the servers 415 may also be running one or more applications, which can be configured to provide services to one or more clients 405 and/or other servers 415.

Merely by way of example, one of the servers 415 may be a web server, which can be used, merely by way of example, to process requests for web pages or other electronic documents from user computers 405. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 405 to perform methods of the invention.

The server computers 415, in some embodiments, might include one or more application servers, which can include one or more applications accessible by a client running on one or more of the client computers 405 and/or other servers 415. Merely by way of example, the server(s) 415 can be one or more general purpose computers capable of executing programs or scripts in response to the user computers 405 and/or other servers 415, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 405 and/or another server 415. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 405 via a web server (as described above, for example). Similarly, a web server might receive web page requests and/or input data from a user computer 405 and/or forward the web page requests and/or input data to an application server. In some cases a web server may be integrated with an application server.

In accordance with further embodiments, one or more servers 415 can function as a file server and/or can include one or more of the files (e.g., application code, data files, etc.) necessary to implement methods of the invention incorporated by an application running on a user computer 405 and/or another server 415. Alternatively, as those skilled in the art will appreciate, a file server can include all necessary files, allowing such an application to be invoked remotely by a user computer 405 and/or server 415. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 420. The location of the database(s) 420 is discretionary. Merely by way of example, a database 420a might reside on a storage medium local to (and/or resident in) a server 415a (and/or a user computer 405). Alternatively, a database 420b can be remote from any or all of the computers 405, 415, so long as the database can be in communication (e.g., via the network 410) with one or more of these. In a particular set of embodiments, a database 420 can reside in a storage-area network ("SAN") familiar to those skilled in the art. (Likewise, any necessary files for performing the functions attributed to the computers 405, 415 can be stored locally on the respective computer and/or remotely, as appropriate.) In one set of embodiments, the database 420 can be a relational database, such as an Oracle™ database, that is adapted to store, update, and retrieve data in response to SQL-formatted commands. The database might be controlled and/or maintained by a database server, as described above, for example.

Figure 5:
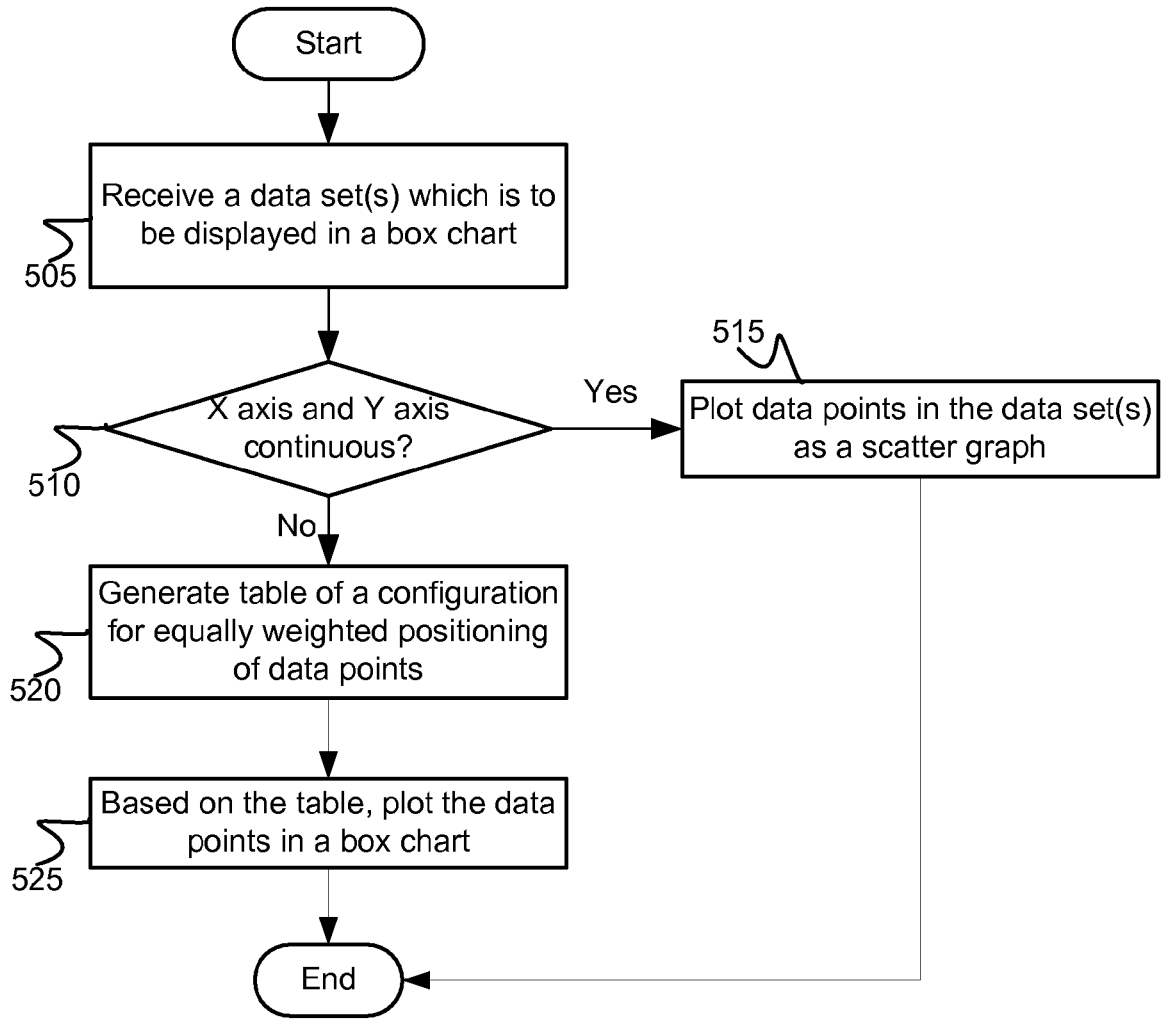
FIG. 5 is a flow diagram illustrating a method of generating a box chart, according to embodiments of the present invention.

Turning now to FIG. 5, a flow diagram illustrates a method 500 of generating a box chart, according to embodiments of the present invention. At process block 505, a data set (or data sets) is received from a data source. In one embodiment, the data set may include a number of ordered pairs (X,Y) which are used to plot points on a graph or chart (i.e., a box chart). The data set may include employee performance data, sales results, product performance data, etc. The data set may be received from a storage device (e.g., a disk storage, optical medium, remote storage, etc.), which, for example, may be collecting the data within the data set.

Furthermore, each ordered pair may represent a data point which may be displayed within a box chart. The box chart includes an x-axis and a y-axis, and each ordered pair is plotted according to the corresponding X and Y values. For example, assume that the data set includes data related to employee performance versus employee potential with three discrete values (e.g., high, medium, and low) for performance and three discrete values (e.g., high, medium, and low) for potential (decision block 510). As such, there are nine possible combinations (i.e., high performance and high potential, low performance with low potential, high performance and medium potential, and so forth). Hence, an N×N box chart is generated. As is apparent, a number of employees will have the same values and as such will have the same ordered pair, which in turn would plot onto the box chart at the exact same location.

Hence, at process block 520, a table of configurations for equally weighted positioning of ordered pairs (or data points) may be generated. The table defines a precise arrangement of "markers", where the arrangement varies depending on the number of markers within a box of the box chart. Each arrangement is roughly circular and has an orderly appearance which conveys a gestalt impression to the user that each marker is a co-equal member of the same group. In one embodiment, these arrangements may be called "clumps." Accordingly, no single marker is given a greater weight than any other marker within the box, thus indicating that each marker within the box is equally valued. It should be noted that the table may be generated prior to plotting the box chart, and may also be stored in a storage medium for subsequent use.

At process block 525, based on the generated table, the data points (represented by markers) are plotted within the box chart. Alternatively, if at decision block 510, the x-axis and the y-axis are determined to be continuous, then at process block 515, the ordered pairs are each plotted according to their values, and a scatter graph is generated. Furthermore, markers may be any graphical representation. For example, an icon of a person, an animal, an object, etc., may be used. Alternatively, any thumbnail, jpeg, bitmap, etc., may be used. Additionally, the size of the markers may be altered in order to accommodate for an increased number of markers being located within a single box in the box chart. For example, the markers in a box with fifty markers would be smaller than the markers in a box with twenty markers, and so forth. The size may be altered such that no overlapping of the markers occurs.

Additionally, a user interface device (e.g., a mouse, a stylus, a touch screen, and a keyboard, etc.) may be used to move (i.e., drag and drop the markers) or otherwise manipulate the markers within the box chart. Accordingly, the plotting of each box within the box chart may be redrawn in the event that a change is made to one of the boxes within the box chart. Hence, at all times, the markers fill the space within the box in a balanced way, without overlapping, while conveying a sense that the markers within the box are co-equal. Thus, the box chart is both aesthetically pleasing and easy to read and understand.

Figure 6:
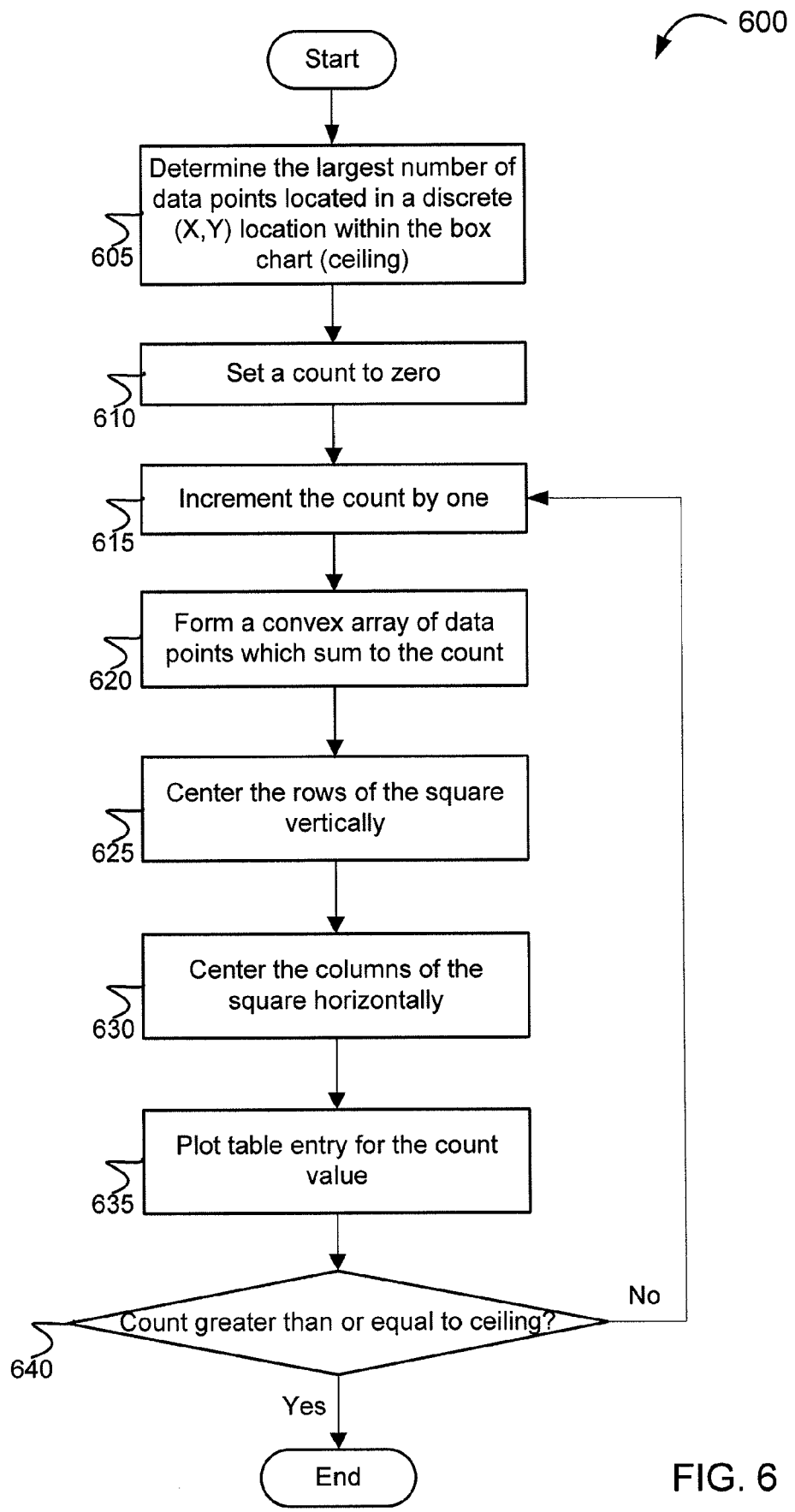
FIG. 6 is a flow diagram illustrating a method of generating a table used to construct a box chart, according to one embodiment of the present invention.

Turning now to FIG. 6, a flow diagram illustrates a method 600 of generating a table used to generate a box chart, according to embodiments of the present invention. At process block 605, a determination is made as to what is the largest number of markers that can be located in a discrete (X,Y) location within a box of the box chart. In other words, what is the "ceiling" on the number of markers to be included in a single box within the box chart. Hence, based on the ceiling, the total number of entries within the table is determined, where each entry includes a unique configuration for a specific number of markers or data points.

At process block 610, a count value is set to zero and then at process block 615, the count is incremented by one. A configuration of data points equal to the count is generated as a roughly square convex array consisting of one or more rows which may have a different number of points in each row (process block 620). Here, "convex" means that the number of points in each row will have at least as many points as contained in the first row, so that the overall array may have a bulge of wider rows in the middle. For example, the convex array for eighteen data points consists of row one with four points, row two with five points, row three with five points, and row four with four points. Furthermore, at process block 625, each row of the pseudo-square is centered vertically, and then each row is centered horizontally (process block 630).

At process block 635, the table entry for the number of data points equal to the current count value is plotted. At decision block 640, it is determined whether the count is greater than or equal to the ceiling. If the count is not greater than or equal to the ceiling, then the process moves to process block 615 until the count is incremented to greater than or equal to the ceiling.

Figure 7:
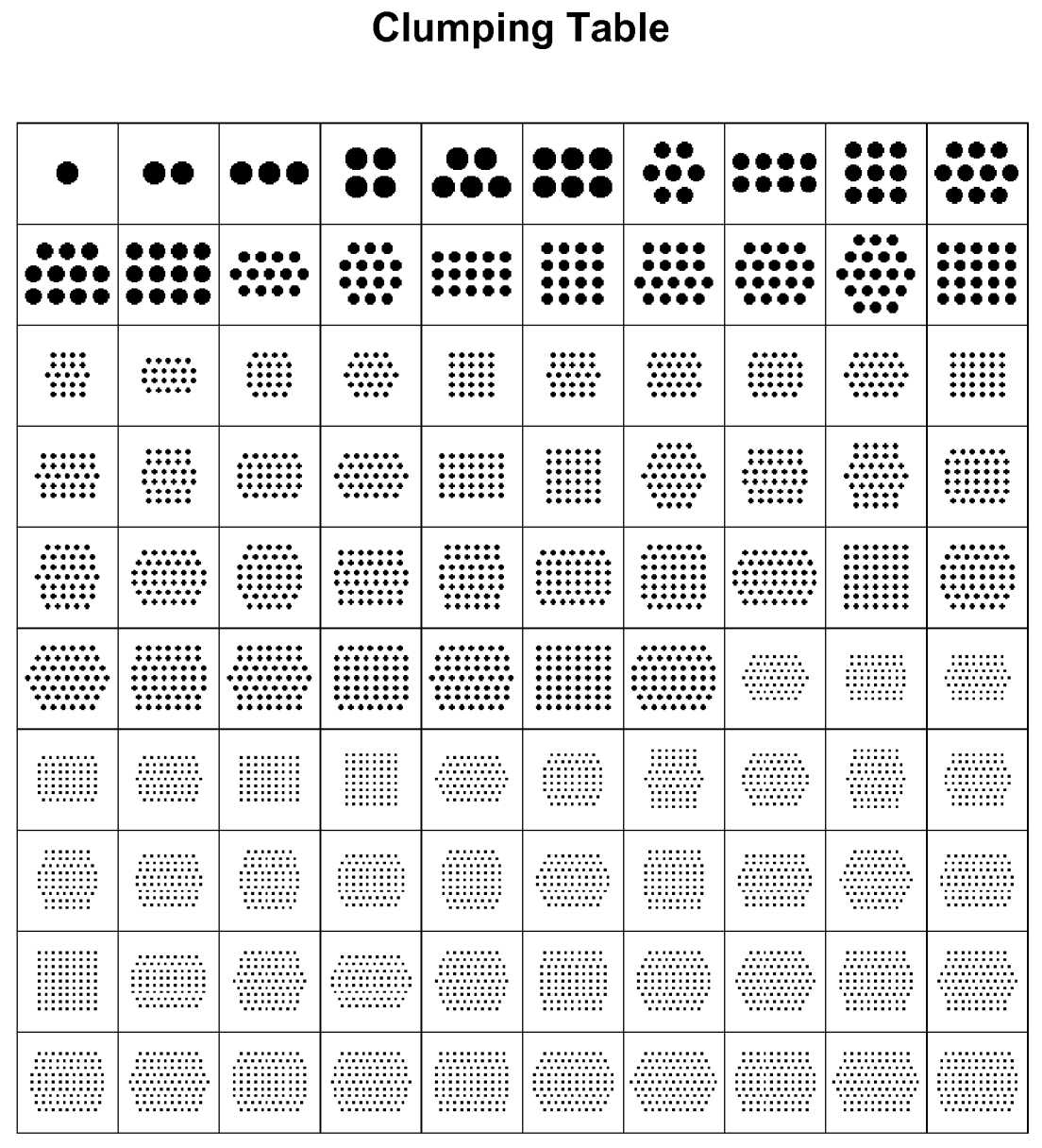

Referring next to FIG. 7, a diagram illustrates the table from FIG. 6, according to one embodiment of the present invention. The "clumping table" illustrates table entry plotting for one to one hundred data points. As is shown in each entry, the configuration is displayed in such a way that each marker has a co-equal value with respect to all other markers. No individual marker has a weight greater than another. Thus, when any of these entries are used in a box chart, an accurate and readable representation of the data set is portrayed.

Figure 8:
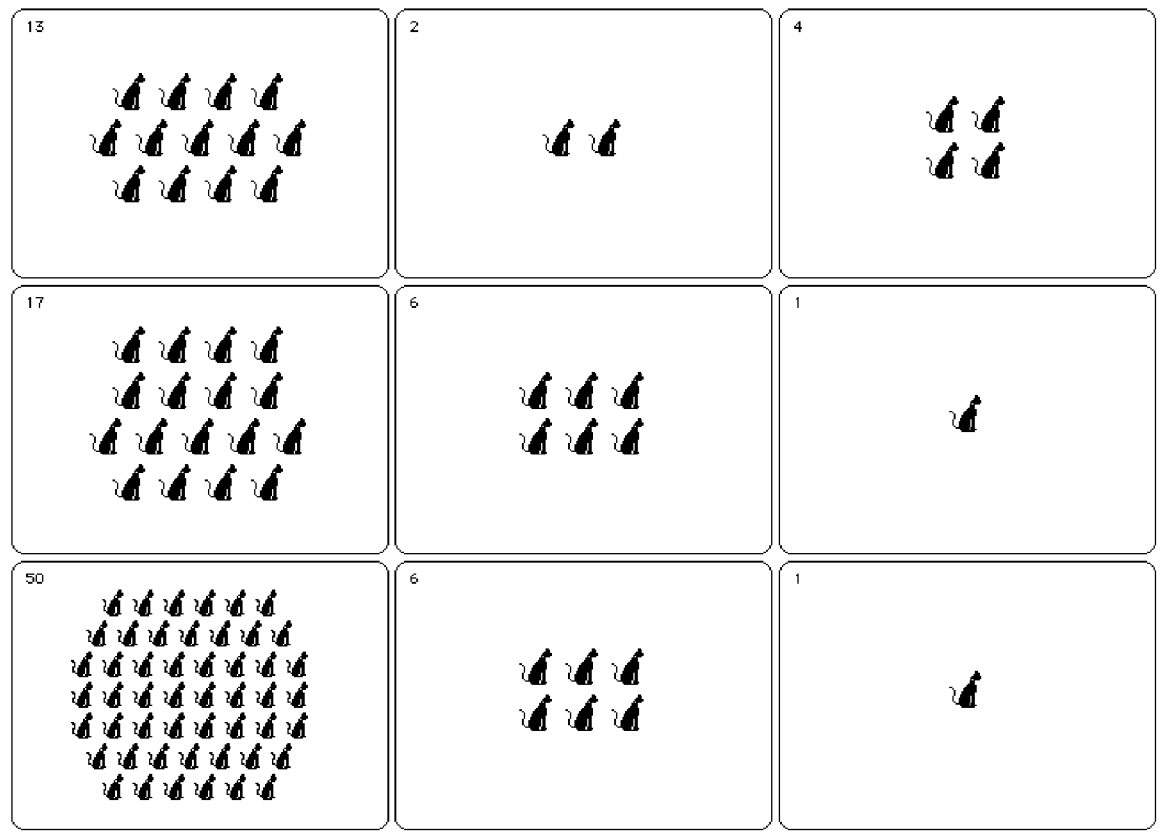
FIG. 8 is a diagram illustrating a box chart with a discrete x-axis and a discrete y-axis, according to one embodiment of the present invention.

Turning now to FIG. 8, a diagram illustrates a box chart, according to embodiments of the present invention. The box chart in FIG. 8 shows a chart where the x-axis and the y-axis are both discrete. Furthermore, each box is plotted using one of the configurations from the clumping table in FIG. 7. For example, the top left box uses the thirteenth entry in the table from FIG. 7, the middle box uses the sixth entry in the table from FIG. 7, and so forth. Accordingly, any combination of configurations may be used to plot the box chart based on the data set. It should be noted that "cat" markers have been used; however, any other graphical representation may be used, and the "cat" marker is merely for explanatory purposes.

Furthermore, according to a further embodiment, if a user interface device (e.g., a mouse, stylus, keyboard, touchscreen, etc.) is placed over a marker, the marker may be able to be enlarged, or alternatively, a text box with information about the marker may be displayed (e.g., the name of the person the marker represents, the name of the product the maker represents, etc.).

Figure 9:
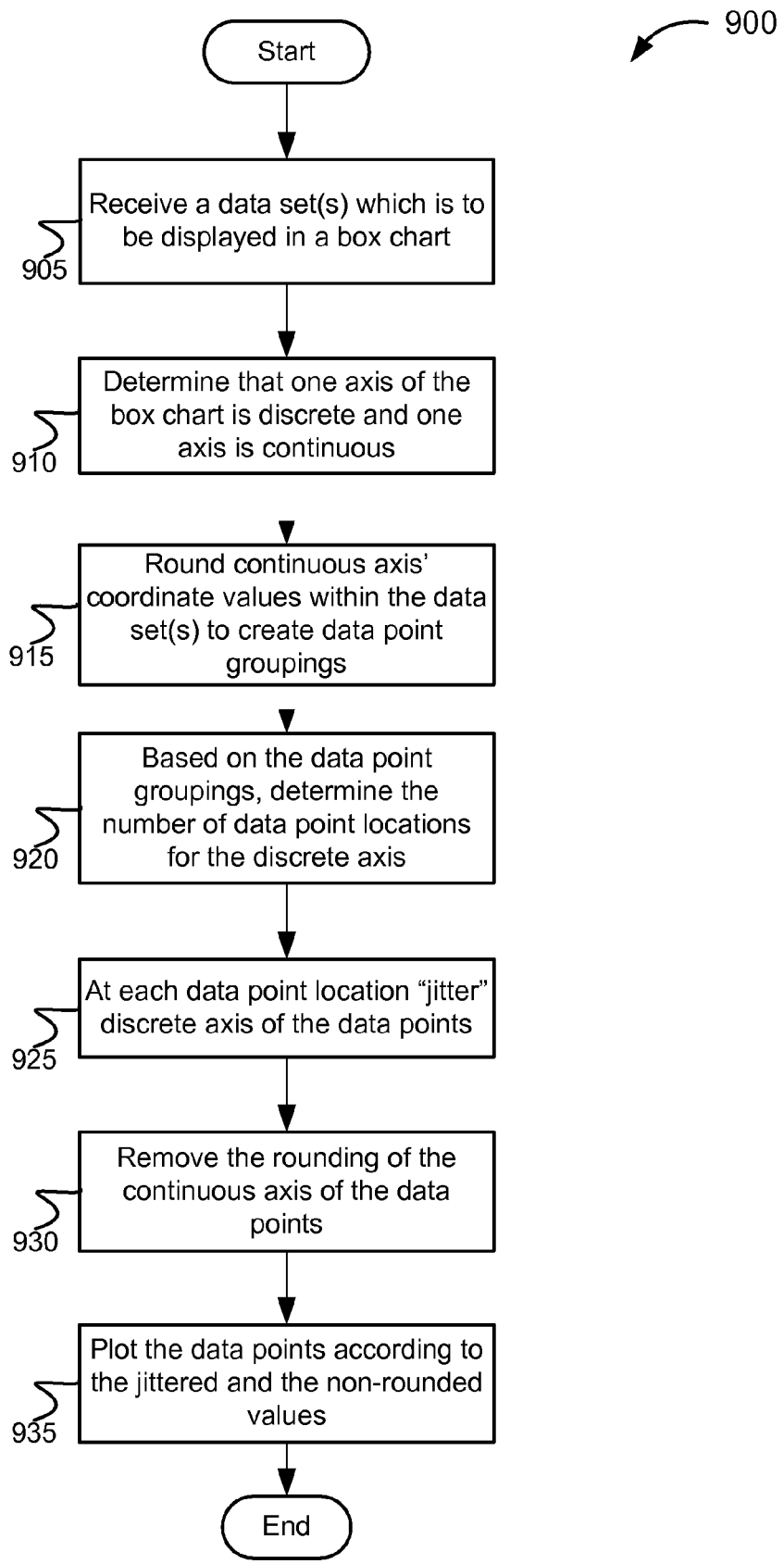
FIG. 9 is a flow diagram illustrating a method for generating a box chart, according to one embodiment of the present invention.

FIG. 9 illustrates a method 900 of generating a box chart, according to embodiments of the present invention. At process block 905, a data set may be received from a host computer system. The data set is to be displayed in a box chart. At process block 910, it is determined that one of the axes is continuous and one of the axes is discrete (i.e., the axes are "mixed"). Hence, in the box chart, the discrete axis values would be, for example, whole numbers, while the continuous axis values would be real numbers. Therefore, many of the values for the discrete axis would be the same, while only a few, if any, values for the continuous axis would be the same.

Thus, in order to plot such a box chart, at process block 915, the values from the continuous axis are rounded to the nearest whole number or to some other regular interval. The rounding may be based on a level of granularity, which may be adjusted to change the relative placement of the markers within the box chart. Accordingly, the rounded values create "data point groupings." For example, if the following values existed in the data set for the continuous axis: 2.3, 2.4, 2.41, 4.5, 4.6, 4.8, and 8.1, three groupings would likely be created (i.e., 3 points with the value of 2, three points with the value of 4, and one point with the value of 8. Accordingly, based on the groupings, the number of data point locations for the discrete axis data points is determined (process block 920).

At process block 925, at each determined data point location, the discrete values are "jittered." "Jittered" means that the data points are moved slightly in one or more directions in order to change the location of the marker without overly affecting the location. The amount of movement that occurs from the jittering may be adjusted with a level of granularity set for the data set.

After the discrete values have been jittered, the continuous values are allowed to return to their pre-rounded value (process block 930). Thus, the continuous values are plotted with their original value, and the discrete values are jittered as described above. Furthermore, at process block 935, the ordered pairs created by the continuous and discrete values are plotted into mixed box charts. Examples of such mixed box charts are shown in FIGS. 10A and 10B.

Figure 10A:
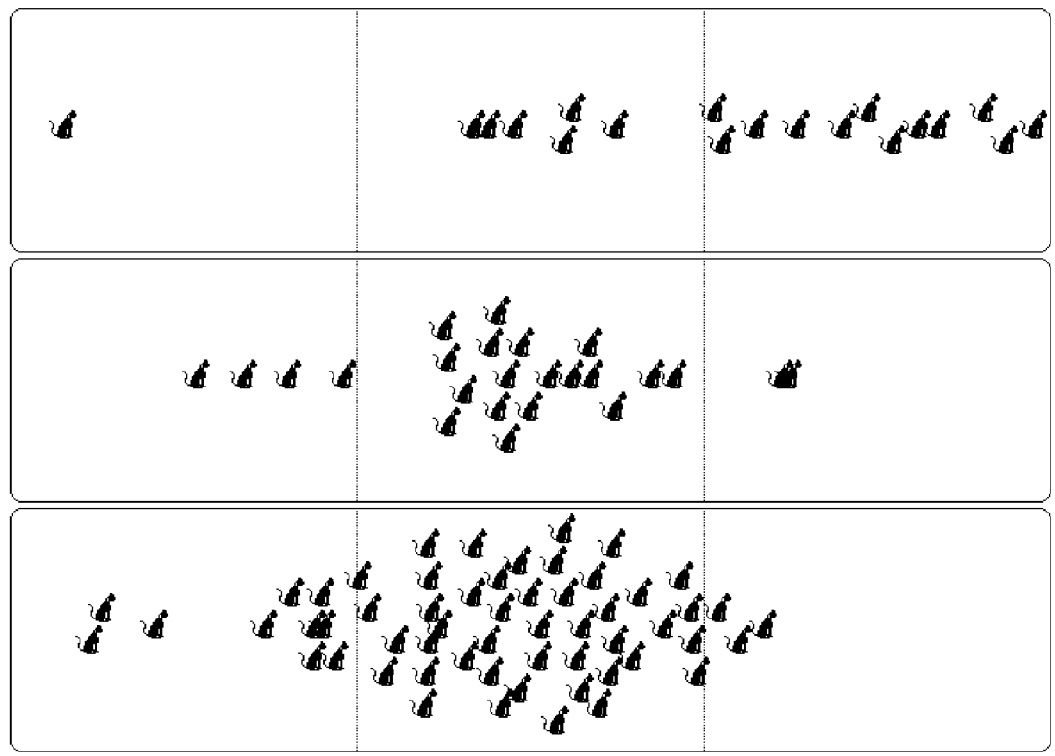
FIGS. 10A and 10B are diagrams illustrating box charts with a continuous x-axis and a discrete y-axis and a discrete x-axis and a continuous y-axis, respectively, according to one embodiment of the present invention.

Turning now to FIG. 10A, a diagram illustrates a mixed box chart, according to one embodiment of the present invention. FIG. 10A shows a mixed box chart where the x-axis is the continuous axis and the y-axis is the discrete axis. As can be seen, the x-axis values retain their original value, while the y-axis values have been jittered slightly. Additionally, there is a gap between the boxes only on the x-axis to denote that the x-axis values are continuous.

Figure 10B:
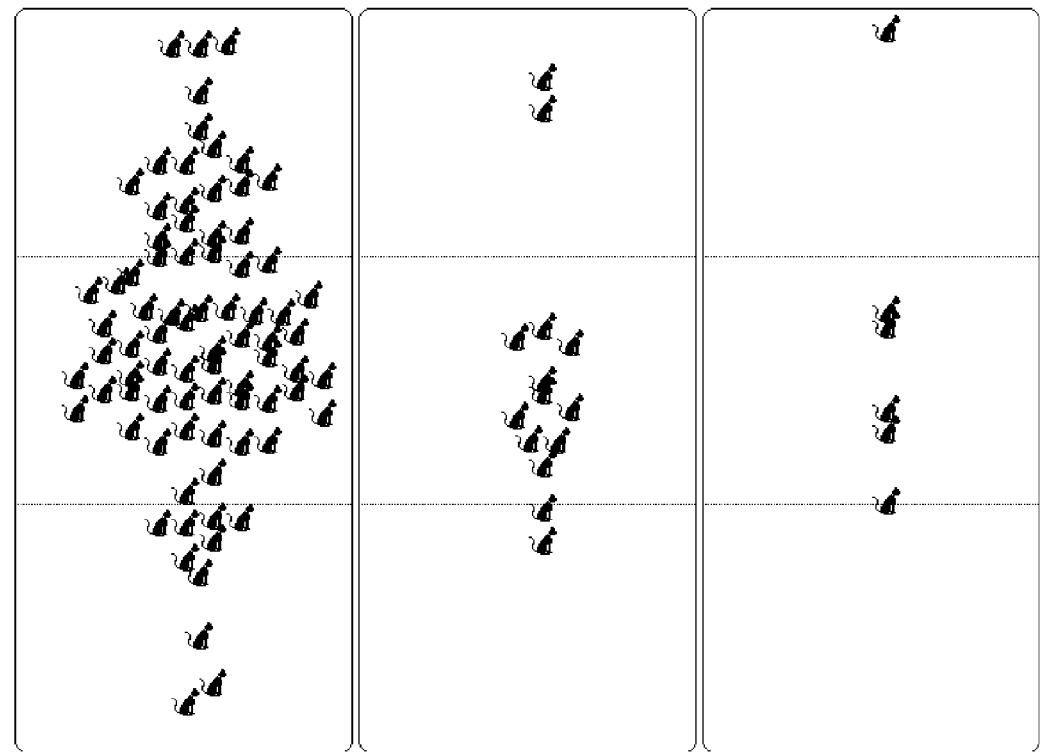

Referring next to FIG. 10B, a diagram illustrates a box chart, according to another embodiment of the present invention. FIG. 10B shows a mixed box chart where the x-axis is the discrete axis and the y-axis is the continuous axis. As can be seen, the y-axis values retain their original value, while the x-axis values have been jittered slightly. Additionally, there is a gap between the boxes only on the y-axis to denote that the y-axis values are continuous.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A computer implemented method of plotting a graphically displayed box chart, the method comprising:
   receiving, at a host computer system, a data set, wherein the data set includes a first axis and a second axis and the data set consists of ordered pairs;
   determining that the first axis is discrete and that the second axis is continuous;
   rounding values of the second axis' portion of the ordered pairs of the data set, based on a first level of granularity defined for the data set;
   based on the rounded values, creating data point groupings;
   based on the data point groupings, determining a total number of data point locations for the first axis;
   jittering values of the first axis' portion of the ordered pairs of the data set at each determined data point location, wherein the jittering comprises moving one or more of the values in one or more directions along the first axis by altering the values based on a second level of granularity defined for the data set;
   reverting the rounded values back to the original values;
   based on the data point groupings and the jitter values, generating a table of a plurality of graphically represented configurations of data points, wherein each configuration in the table includes a distinct number of data points within the configuration, wherein the plurality of graphically represented configurations position the data points such that each of the data points is positioned equally within the graphically represented configuration, wherein each configuration entry in the table comprises a unique clumping arrangement of data points, and wherein the unique clumping arrangement comprises a co-equal value for each data point within the clumping;
   based on the jittered values for the first axis and the original values for the second axis, plotting, at the host computer system, the data points in a box chart in the unique clumping arrangement; and
   displaying the box chart on a display screen.

2. The method of claim 1, wherein the first axis is the x axis of the graph and the second axis is the y axis of the graph.

3. The method of claim 1, wherein the first axis is the y axis of the graph and the second axis is the x axis of the graph.

4. The method of claim 1, wherein data associated with the data set comprises one or more of the following: employee performance data, product performance data, and sales results data.

5. The method of claim 1, further comprising adjusting, at the host computer system, the first and second levels of granularity.

6. The method of claim 1, wherein the data points are graphically represented by graphical markers.

7. The method of claim 6, wherein the graphical markers comprise one or more of the following: icons, bitmaps, jpegs, and thumbnails.

8. A system for plotting a graphically displayed box chart, the system comprising:
   a display device;
   a processor coupled with the display device; and
   a memory device coupled with the processor, the memory device having sets of instructions stored thereon which, when executed by the processor, cause the processor to:
     receive, at a host computer, a data set, wherein the data set includes a first axis and a second axis and the data set consists of ordered pairs,
     determine that the first axis is discrete and that the second axis is continuous,
     round values of the second axis' portion of the ordered pairs of the data set, based on a first level of granularity defined for the data set,
     based on the rounded values, create data point groupings,
     based on the data point groupings, determine a total number of data point locations for the first axis,
     jitter values of the first axis' portion of the ordered pairs of the data set at each determined data point location, wherein the jittering comprises moving one or more of the values in one or more directions along the first axis by altering the values based on a second level of granularity defined for the data set,
     revert the rounded values back to the original values,
     based on the data point groupings and the jitter values, generating a table of a plurality of graphically represented configurations of data points, wherein each configuration in the table includes a distinct number of data points within the configuration, wherein the plurality of graphically represented configurations position the data points such that each of the data points is positioned equally within the graphically represented configuration, wherein each configuration entry in the table comprises a unique clumping arrangement of data points, and wherein the unique clumping arrangement comprises a co-equal value for each data point within the clumping,
     based on the jittered values for the first axis and the original values for the second axis, plot the data points in a box chart in the unique clumping arrangement, and
     display, on the display device, the box chart.

9. The system of claim 8, wherein jittering further comprises moving the data points' locations by an amount equal to the second level of granularity.

10. The system of claim 8, wherein the data points displayed within the box chart comprise a balanced scatter.

11. The system of claim 10, wherein the balanced scatter is configured to allow continuous values to overlap, and to spread discrete values from a center position based on a total number of data points at the data point locations.

12. A non-transitory machine-readable medium for plotting a graphically displayed box chart, the machine-readable medium including sets of instructions stored thereon which, when executed by a machine, cause the machine to:
- receive, at a host computer, a data set, wherein the data set includes a first axis and a second axis and the data set consists of ordered pairs;
- determine that the first axis is discrete and that the second axis is continuous;
- round values of the second axis' portion of the ordered pairs of the data set, based on a first level of granularity defined for the data set;
- based on the rounded values, create data point groupings;
- based on the data point groupings, determine a total number of data point locations for the first axis;
- jitter values of the first axis' portion of the ordered pairs of the data set at each determined data point location, wherein the jittering comprises moving one or more of the values in one or more directions along the first axis by altering the values based on a second level of granularity defined for the data set;
- revert the rounded values back to the original values;
- based on the data point groupings and the jitter values, generating a table of a plurality of graphically represented configurations of data points, wherein each configuration in the table includes a distinct number of data points within the configuration, wherein the plurality of graphically represented configurations position the data points such that each of the data points is positioned equally within the graphically represented configuration, wherein each configuration entry in the table comprises a unique clumping arrangement of data points, and wherein the unique clumping arrangement comprises a co-equal value for each data point within the clumping;
- based on the jittered values for the first axis and the original values for the second axis, plot the data points in a box chart in the unique clumping arrangement; and
- display the box chart on a display screen.

13. The non-transitory machine-readable medium of claim 12, wherein the data points are graphically represented by graphical markers.

14. The non-transitory machine-readable medium of claim 13, further comprising when one of the graphical markers is selected by an interface device, the selected graphical marker is enlarged.

15. The non-transitory machine-readable medium of claim 13, wherein the graphical markers are movable within the box chart.

16. The non-transitory machine-readable medium of claim 13, further comprising when one of the graphical markers is selected by an interface device, data associated with the selected graphical marker is displayed.

17. The non-transitory machine-readable medium of claim 13, wherein the graphical markers' size is adjustable.

18. The non-transitory machine-readable medium of claim 12, wherein the first axis is the x axis of a graph and the second axis is the y axis of a graph.

19. The non-transitory machine-readable medium of claim 12, wherein the first axis is the y axis of a graph and the second axis is the x axis of a graph.

* * * * *